United States Patent [19]

Gatzen

[11] Patent Number: 4,839,761
[45] Date of Patent: Jun. 13, 1989

[54] MAGNETIC HEAD FOR PERPENDICULAR MAGNETIC RECORDING SYSTEM

[75] Inventor: Hans-Heinrich O. P. Gatzen, Aptos, Calif.

[73] Assignee: Seagate Technology, Inc., Scotts Valley, Calif.

[21] Appl. No.: 80,063

[22] Filed: Jul. 31, 1987

[51] Int. Cl.$^4$ ............................................. G11B 5/60
[52] U.S. Cl. .................................... 360/103; 360/125
[58] Field of Search ........ 360/119, 120, 123, 125–127, 360/103

[56] References Cited

U.S. PATENT DOCUMENTS 4,742,413 5/1988 Schewe ............................. 360/126

FOREIGN PATENT DOCUMENTS 59-96517 6/1984 Japan .................................. 360/113
61-134907 6/1986 Japan .................................. 360/113

Primary Examiner—A. J. Heinz
Attorney, Agent, or Firm—Flehr, Hohbach, Test, Albritton & Herbert

[57] ABSTRACT

A disc drive is disclosed incorporating a non-magnetic slider, a thin film main pole on the leading face thereof and a C-shaped flux collector extending forward from that same face, with the lower portion of the C-shaped flux collector being positioned slightly above the recording surface. The main pole, when energized, disperses the magnetic flux vertically through the "hard" medium and then through the "soft" medium to be returned to and collected by the foot of the C-shaped flux collector. In a preferred embodiment, the corners of this lower or foot portion of the flux collector are not sharp, to prevent flux concentration at any of those corners. In this design, the energizing coil may be wound about either a yoke which connects the C-shaped flux collector to the non-magnetic slider or the back portion of the flux collector itself.

22 Claims, 5 Drawing Sheets

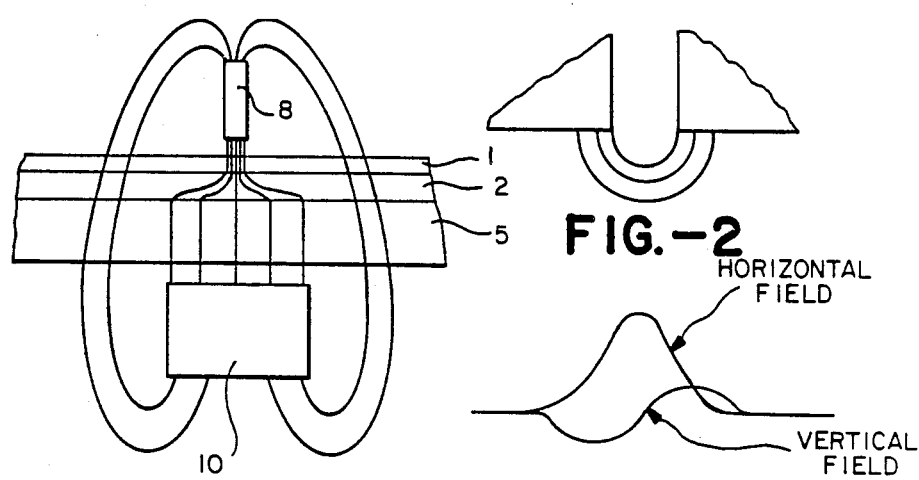
FIG.-1
FIG.-2
FIG.-3 HORIZONTAL FIELD / VERTICAL FIELD
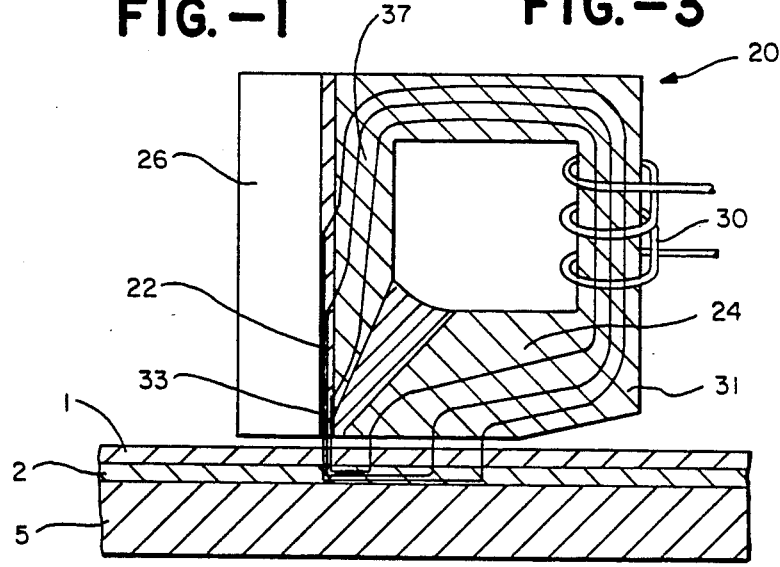
FIG.-4A
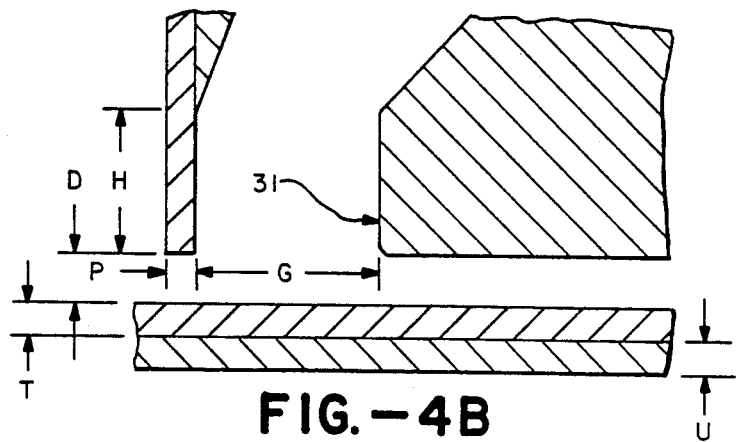
FIG.-4B

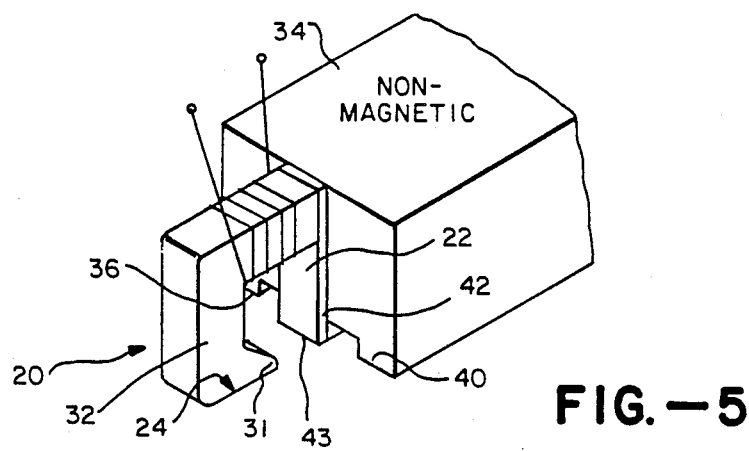
FIG.-5
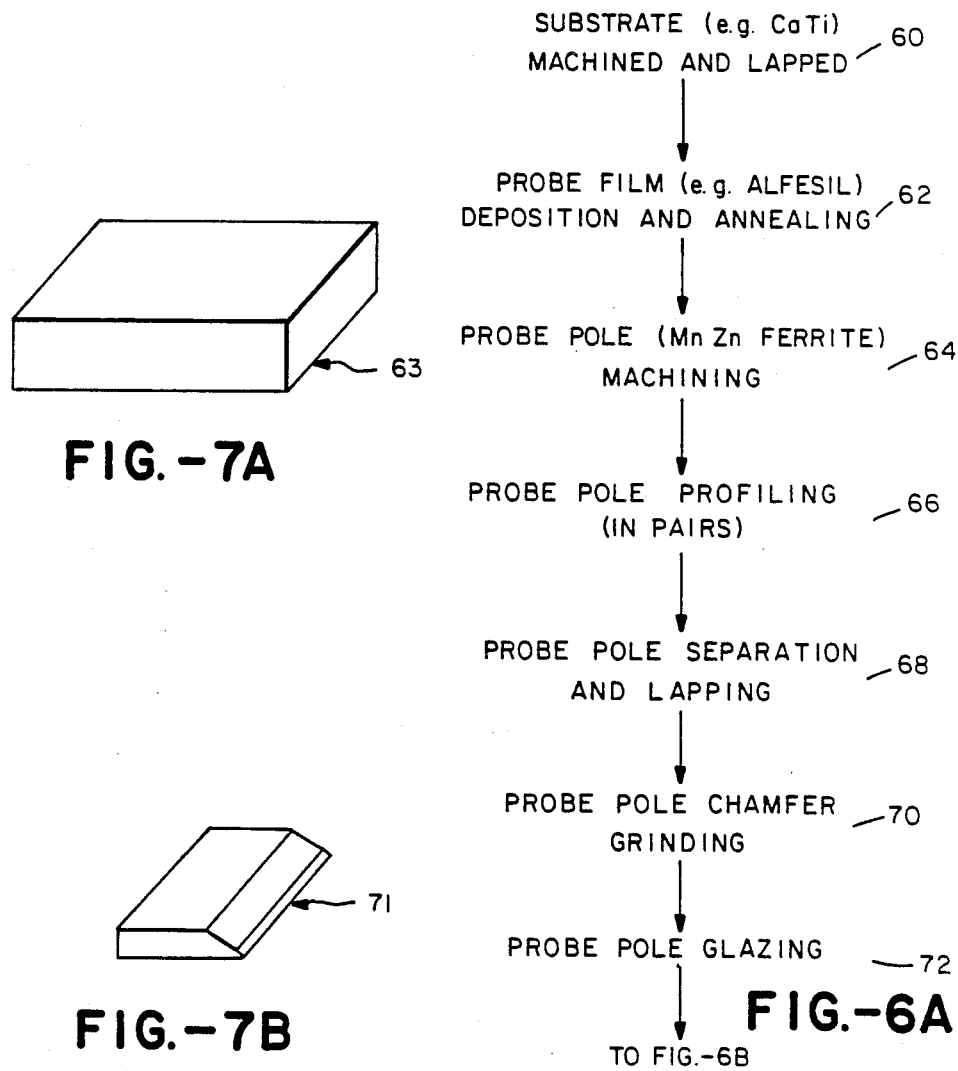
FIG.-7A
FIG.-7B
FIG.-6A

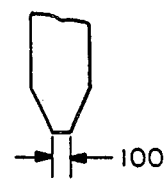
FIG.—8A
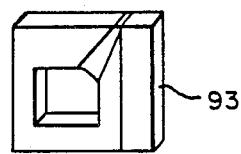
FIG.—7G
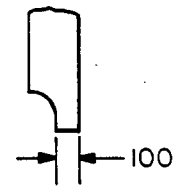
FIG.—8B
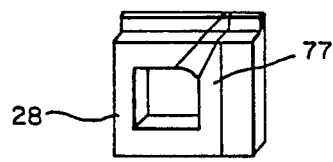
FIG.—7H
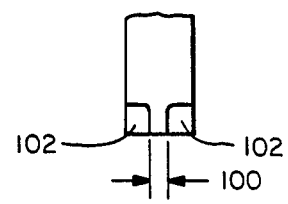
FIG.—8C
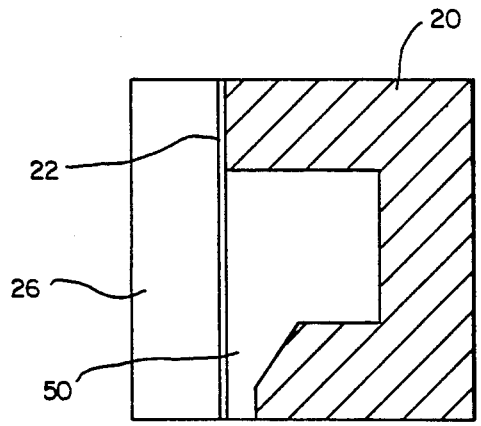
FIG.—9A

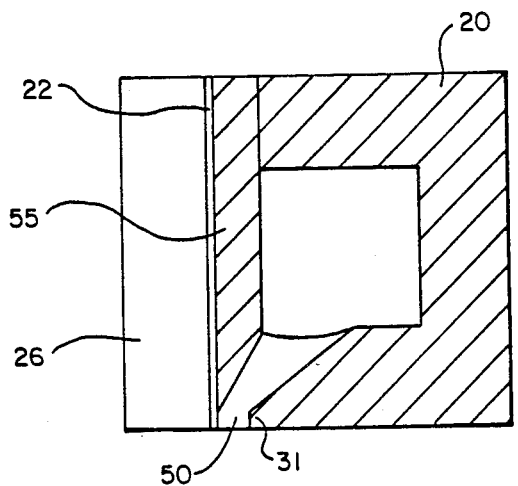
FIG.—9B
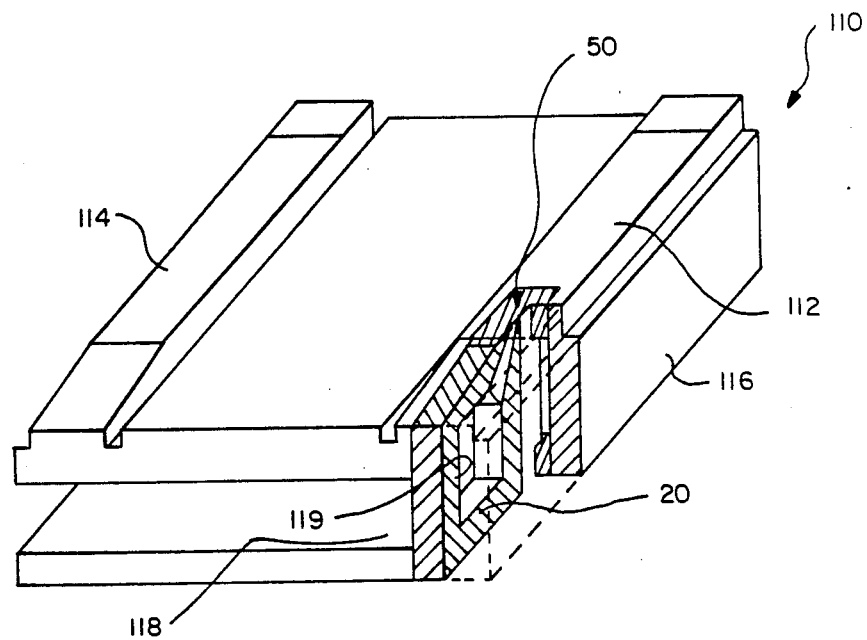
FIG.—10

MAGNETIC HEAD FOR PERPENDICULAR MAGNETIC RECORDING SYSTEM

BACKGROUND OF THE INVENTION

This invention relates generally to a magnetic head for a perpendicular magnetic recording system, and more particularly to a thin film magnetic head which is especially adapted for recording on double-sided discs or media.

As is well known, magnetic recording methods are classified generally into two modes. The first is a recording mode using longitudinal residual magnetization on the surface of the recording media, while the other mode uses perpendicular residual magnetization. The longitudinal magnetic record method has long been employed. However, because of the potential increase in storage capacity for a given recording area, the next major breakthrough in magnetic recording of digital data is expected to be the transition from longitudinal recording (where the data is recorded horizontally along a circular data track on a disc surface) to vertical recording (where data is recorded perpendicular to the data surface).

In the development of perpendicular recording systems, known systems are based on the concepts shown in FIGS. 1 and 2. In the configuration shown in FIG. 1, the recording medium consists of a "hard" magnetic layer 1, with vertical orientation; a "soft" magnetic underlayer 3; and a non-magnetic substrate 5. The read/write head is composed of two portions: a very narrow main pole 8 to concentrate the magnetic flux in a small area, and a magnetic auxiliary pole 10 having a much greater surface area and carrying the read/write coil. FIG. 1 shows that the portion of the flux pattern that passes through the "hard" magnetic layer 1 is essentially vertical. The flux path is then dispersed in the "soft" magnetic underlayer to be collected by the large surface area of auxiliary pole 10. The primary disadvantage of this system is that since the main pole 8 and auxiliary pole 10 are face-to-face on opposite sides of the recording medium, this system cannot be used for magnetic recording systems using a rigid substrate recording medium such as a rigid magnetic disc unit, nor for a two-sided recording system. Moreover, the recording efficiency is rather low because of the separation of the main and auxiliary poles.

A second configuration suggested for vertical recording is using a conventional head as used for longitudinal recording see FIG. 2, called a Karlquist head. This can be used in conjunction with a single layer medium. Therefore, it does allow recording on both sides of the medium; but it has many disadvantages. Specifically, it can be seen by reference to FIG. 3, which is aligned below the head of FIG. 2, that the vertical component of the flux pattern is relatively small and longer when compared with the horizontal component. Therefore, a Karlquist head recording on a single layer vertically oriented medium does not promise a significant increase in recording density over longitudinal recording because of the excess length of each recorded bit.

U.S. Pat. No. 4,404,609 (Jones) and 4,438,471 (Oshiki, et al.) disclose prior art efforts at improving the deficiencies of the two basic approaches. These patents are incorporated herein by reference insofar as they are useful for their disclosures of the formation and materials incorporated in thin film heads. However, both of these patents disclose a vertical head recording system in which the heads are quite complex to fabricate.

SUMMARY OF THE INVENTION

It is therefore an objective of this invention to provide a head suitable for vertical magnetic recording which is relatively simple to fabricate and can be accurately positioned over a location to be accessed on the recording medium.

It is a further objective herein to provide a vertical recording magnetic head in which the main pole is relatively thin so that the horizontal extent or width of each recorded bit is very limited, thereby maximizing the density of the vertically recorded data.

Yet another objective is to provide a vertical recording magnetic head which is relatively easily incorporated into known disc drives by supporting it on a slider of a type already well known and developed in disc drive art. This is done to standardize to the extent possible construction of such disc drives and take advantage of technology of known reliability.

These and other objectives of this invention are achieved in a disc drive incorporating a non-magnetic slider, supporting a thin film main pole and a C-shaped flux collector or core to complete the magnetic circuit and support the coil. The lower portion of the C-shaped flux collector is positioned slightly above the recording surface for reading or writing bits of data on the disc. The main pole, when energized, disperses the magnetic flux vertically through the "hard" medium, then through the "soft" medium to be returned to and collected by the foot of the C-shaped flux collector. The gap between main pole and flux collector is filled with glass.

In a preferred embodiment, the corners of this lower or foot portion of the flux collector are not sharp, to prevent flux concentration at any of those corners. The energizing coil may be wound about either a yoke which connects the C-shaped flux collector to the non-magnetic slider or the back portion of the flux collector itself. Several embodiments are disclosed for mounting the flux collecting core on the slider.

BRIEF DESCRIPTION OF THE DRAWINGS

This invention and its advantages and features will be apparent from the ensuing description with reference to the accompanying drawings, wherein FIG. 1 is a schematic elevational drawing of a conventional perpendicular magnetic recording system of the auxiliary pole excitation type as well known in this technology;

FIG. 2 is the pole configuration of a conventional magnetic head used for perpendicular magnetic recording on single layer media;

FIG. 3 is a curve illustrating the vertical and horizontal recording field components of the head of FIG. 2;

FIGS. 4A and 4B are side elevational views of the recording head flux collector and slider shown over the recording medium with which it is preferably used;

FIG. 5 is a perspective view of the magnetic head for perpendicular magnetic recording of this invention;

FIGS. 6A and 6B are flow charts of exemplary steps used in making the probe of this invention;

FIGS. 7A through 7F show the results of the process of FIG. 6 at several stages of the process;

FIGS. 8A, 8B, 8C and 9A and 9B show alternative designs for the head of this invention; and FIG. 10 shows an alternative made for mounting for the head of this invention.

DESCRIPTION OF A PREFERRED EMBODIMENT

Figure 7C:
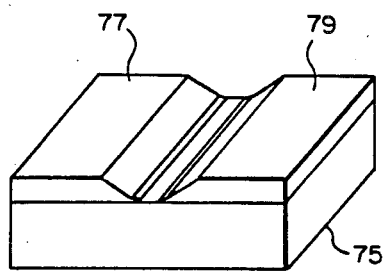

A preferred embodiment of this invention consists of a claw or C-shaped head 30 (FIG. 4) that provides the advantages of high density recording on double-sided, two-layer media, and structure for mounting the head 30 to position it over recording media. Referring to FIG. 4, it can be seen that the recording media consists of a hard magnetic layer 1 with vertical orientation, a soft magnetic underlayer 2, and the substrate 5 supporting the first two layers.

The head 20, a preferred embodiment of which appears in vertical section in FIG. 4A, includes several elements: a thin film main pole 22 for writing data on the magnetic surface; a flux collector 24, supported adjacent the main pole for completing the magnetic return path through the magnetic media 1; a yoke 28 for coupling the flux back to the main pole 22; and a coil 30 for energizing the head.

Data are written onto the vertical recording media 1 by the probe structure of main pole 22. The flux path is completed through the soft magnetic underlayer 5 of the recording medium, the flux collector 24, and the yoke 28 which connects the flux collector to the main pole 22. On the surface of the head closest to the medium, there is a gap between the main pole 22 and the flux collector 24. The gap should be wide enough to maximize the flux being transmitted down through the recording medium and returning through the flux collecting foot of the head. It is typically filled with glass to fix the relative positions of elements of the head.

A side elevational view of the recording head is shown in FIG. 4B. The critical recording geometry dimensions are the media spacing D, pole length P, pole height H, and the return gap length G. If a soft magnetic underlayer U is provided under the recording media, gap length G may be relatively large (G/P>>1); but G must be controlled otherwise. For adequate efficiency, the ratio of pole height H to pole length P must not be too large. The pole length P is designed to be comparable to the gap length of an ordinary head.

The flux collector 24 and yoke 28 are both part of a core 31 that can be manufactured by a relatively simple process. The core defines a C-shaped figure with a relatively small opening 33 adjacent the flux collector 24. As shown in detail in FIG. 4B, the probe 22 is adjacent the opening 33 and across the opening from the flux collector 24 to define the recording gap length G. The gap 33 is filled with glass to fix the width of the gap.

Figure 6B:
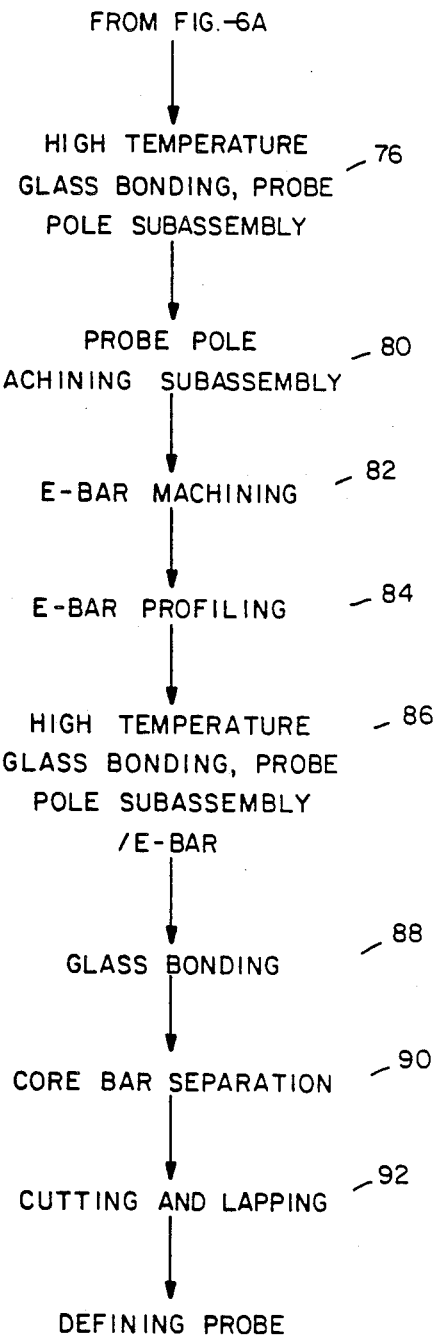

An exemplary process for forming the probe head of this invention is disclosed in the sequence of steps shown in FIG. 6. The process begins by machining and lapping a non-magnetic substrate (step 60). This substrate is to form the mounting substrate 26 for the probe. It is made of a ceramic material (e.g., CaTi) so it does not interfere with the magnetic path created through the mounted probe head. If desired, this ceramic substrate may in fact be machined to form a part of the slider shown in FIG. 5, or may be incorporated into a slider (FIG. 8) defined in accordance with known technologies to be incorporated into a Winchester disc drive.

As the next step 62, a film, for example alfesil, is deposited on the substrate 26 and annealed. This probe film is to be defined into a probe 22 having dimensions related to the track width and the length of each bit to be recorded on the track. In appropriate circumstances, this thin film may be laid down on the surface of a material which is to form a slider 34 in forming an embodiment such as shown in FIG. 5. However, as the core which is to be a part of the overall probe head may be mounted directly to the slider, that is with the back bar 28 mounted to the slider 26, this is not a prerequisite.

The result of step 62 is a combined substrate and probe film 63 shown in FIG. 7A.

As a next and separate step, a piece of manganese ferrite which is to form a probe pole 37 (FIG. 4) is machined (step 64), profiled (in pairs of two for economy) 66, separated and lapped 68 and then chamfer ground 70 forming what will become the probe pole piece shown in FIG. 7B. The last step of chamfer grinding is necessary to provide the beginning of the definition of the gap 33 which will exist between the probe 22 and the flux collector 24. The probe pole 69 shown in FIG. 7B is then glazed on its bottom surface 71 at step 72, after which it is bonded to the probe film and substrate assembly 63 shown in FIG. 7A to form the probe pole subassembly 75 shown in FIG. 7C (step 76). This piece is machined on its top surfaces 77, 79 (step 80) in order to define the exact configuration of the probe pole 37 (FIG. 4) that will be bonded to the piece described below to form the complete core.

Figure 7D:
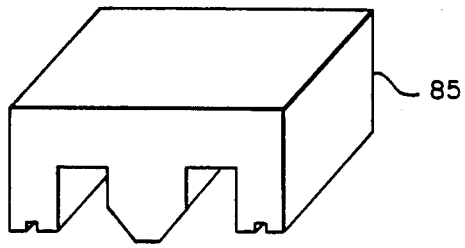
Figure 7E:
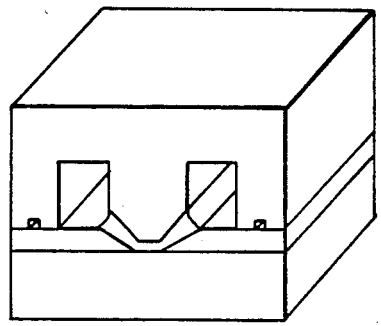
Figure 7F:
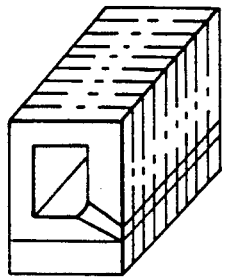

As a next step, a bar of MnZn ferrite is machined (step 82) and profiled (step 84) to form an E bar 85 (FIG. 7D) to be bonded to the probe pole subassembly 75 as shown in FIG. 7E (step 86). The assembly is then glass bonded to form a high intensity unitary system (step 88) and cut into core bars (step 90) as shown in FIG. 7F. These core bars 91 are cut and lapped (step 92) to form individual cores 93 as shown in FIG. 7G.

Beginning with the core 93 shown in FIG. 7G, alternative processes are available to define the exact width of the probe tip. The limitations on the approach to be taken are that the width 100 of the probe tip as shown in FIG. 8A determines the track width. It must be extremely narrow to concentrate the flux at the point where the flux is to emerge from the probe tip head to record the data bit on the recording media. If the core is to be mounted on a slider of the type shown in FIG. 5, then mechanical cutting of the probe tip to define track width 100 is preferable.

As alternative, shown in FIG. 8B, which is especially useful if the core is to be inserted into a slider of the type shown in FIG. 10, is to use mechanical cutting of the probe tip followed by step grinding may be used to define the track width in an even narrower dimension.

As a further alternative useful with the slider of FIG. 5 or FIG. 10, photolithographic shaping of the probe film may be used. This approach has the added advantage of making it easier to shape the corners 102 of the probe pole to prevent undue flux concentration. The approach of FIG. 8B will result in a probe head of the type shown in FIG. 7H.

In all these embodiments, thickness of the main pole or probe 22 is less than the length of the bit cell to be recorded. Because of the orientation of the main pole and its relative spacing away from the flux collector 24, very short length data bits may be recorded, maximizing the density efficiency of data recording in this vertical recording system. Also, it will be apparent from looking at FIG. 7H that the energizing coil 30 (FIG. 4) itself may be wound around either the yoke 28 or the probe pole 37 so that either end of the core may be mounted to the slider, and the core may be mounted with the gap in either a leading or trailing orientation relative to the slider in order to enhance the positioning capabilities of the slider and thereby the probe relative to any designated track position.

It should also be noted that in the preferred embodiment of this process described in FIG. 6, the corners 31 of the flux collecting foot shown in exaggerated form in FIG. 5 are rounded at the corner closest to the recording surface to prevent an undue flux concentration.

FIGS. 9A and 9B illustrate alternative versions of the finished probe head. These alternative designs invoke various tradeoffs between the ability to form the main pole 22 on the face of the ceramic surface 26, the ability to attach the core 20 to the ceramic 26, and the ability to accurately define the geometry of the gap 50 in the probe head.

FIG. 9A illustrates in vertical cross section the probe head which has been explained essentially in FIGS. 4 and 5. That is, it shows the ceramic 26 with a probe layer 22A sputtered on the end surface to define the main pole 22. The head 20A is attached to this sendust main pole surface. A gap 50A is formed at the outer end. Testing has disclosed, however, that while this design has significant advantages of simplicity, it may not possess sufficient flux concentrating ability to accurately work under all operating conditions. Therefore, the design of FIG. 9B has been developed to provide a ferrite back bar or probe pole 55 to increase the ability of the head to concentrate the flux. This design was developed to overcome the difficulty of depositing or sputtering sendust onto the ceramic and ferrite and the necessity of depositing glass which will overlie the ceramic.

Therefore, in the alternative of FIG. 9B the layer 22 for the main pole was again deposited on the ceramic 26. The back bar or probe pole 9B was then attached over the main pole 22, with the core 20C being attached to this back bar. The result is that there is no glass deposition onto the probe joint, and a single bonding glass temperature may be used. This design provides a wider path for flux flow, and significant flux concentration at the tip 31 of the gap 50. However, the geometry of the gap is not easily achieved. Therefore, the optimal design is ultimately a compromise among three alternatives.

As noted, the recording heads manufactured according to this process can be mounted on a slider of the type shown in FIG. 5, with the gap either leading the slider, that is, facing away from the slider, or turned in toward the slider with the main pole deposited directly on the end face of the slider in a preferred embodiment. In a preferable alternative, core 20 is mounted directly into a slider 110 of the type in FIG. 10. This slider, whose basic technology is already known, includes air bearing surfaces 112, 114, for carrying the slider body 116 and flying it just over the surface of a Winchester hard disc. The core 20 can be preferably mounted at the leading portion of one of the air bearing surfaces 112 as shown at the lower right of FIG. 10, (with a portion of the sidewall of the slider cut away for the purpose of illustration only). The core 20 will have a leading edge 118 exposed so that a coil 119 may be wound around it. The recording gap 50 will appear at the bottom of the core at the air bearing surface so that it may be very accurately positioned over any desired track location accessed.

Other alternatives of the design of this invention may become apparent to a person of skill in the art who studies this invention disclosure. For example, the probe hole may be at the leading or trailing edge of the core, the C-shaped head structure itself may have be formed as an independent core, to slide into a notch on the end of the slider, rather than attaching it with some adhesive. There are also variations to achieve the track width. The core may be cut to track width by a machining process, or only the film may be structured, using a photolithographical process.

Therefore, the scope of this invention is to be limited only by the following claims.

What is claimed is:

1. A perpendicular recording magnetic head comprising a slider supporting said head for positioning movement across one side of a recording medium, a main pole supported on an end face of said slider, and a flux collector comprising a C-shaped ferrite pole, one end of said collector being supported by said slider, the other end of said C-shaped pole being separated from said main pole by a recording gap to complete the magnetic circuit through the recording medium, said collector other end and said main pole each having a surface which faces said recording medium wherein the area of the surface of said collector other end is greater than the area of the main pole surface.

2. A perpendicular magnetic recording head as in claim 1 wherein said C-shaped pole includes a back portion and a relatively thicker foot portion slidable over the recording surface and defining an elongated flux collecting surface adjacent said recording gap to collect the flux passing through said magnetic material from said main pole.

3. A perpendicular recording magnetic head as in claim 2 wherein the foot portion of said flux collector has rounded corners to evenly distribute the collected flux.

4. A perpendicular recording magnetic head as in claim 3 including a yoke connecting said C-shaped pole to said slider.

5. A perpendicular recording magnetic head as in claim 4 including a coil for controlling the magnetic recording wound around the yoke.

6. A perpendicular recording magnetic head as in claim 4 including a coil for controlling the magnetic recording wound around the back portion of the C-shaped pole.

7. A perpendicular recording magnetic head as in claim 1 wherein the main pole comprises a thin film head layered on the surface of the slider.

8. A perpendicular magnetic recording head as in claim 7 wherein the main pole comprises a think, highly permeable layer to concentrate the magnetic flux, said flux collector comprising a relatively long plane surface parallel to the surface of said magnetic material to collect the flux.

9. A perpendicular recording magnetic head as in claim 7 wherein said thin film head includes a reduced width portion at the foot of the slider, the reduced width portion of the head concentrating the flux at a tip thereof to reduce the width of the recorded bit.

10. A perpendicular recording magnetic head as in claim 9, wherein the sides of the reduced width head portion are curved to concentrate the flux at the head portion nearest the surface of the magnetic recording medium.

11. A perpendicular recording magnetic system including a recording medium comprising a non-magnetic substrate, a soft magnetic layer over said substrate and a hard magnetic layer with a vertical orientation around said soft magnetic layer, a slider for positioning an access transducer over the recording medium comprising a ferrite access head including, a main pole disposed on a face of the slider, a claw-shaped flux collector separated from said main pole by a gap substantially greater than said main pole thickness, said flux collector being magnetically coupled to said main pole and carried on the face of the slider, said collector having two ends separated by an intermediate portion with one end of said collector which faces said recording medium having an enlarged cross-section compared to a parallel section of said intermediate portion of the collector, a magnetic data access circuit being completed by selective passage of magnetic flux through the main pole, the soft magnetic layer and back to the flux collector on the same side of the recording medium as the main pole.

12. A recording system as in claim 11 wherein a foot portion of said flux collector facing said main pole has rounded corners to evenly distribute the collected flux.

13. A recording system as in claim 12 including a yoke connecting said claw-shaped flux collector to said slider and a coil for controlling the magnetic recording wound around the yoke.

14. A recording system as in claim 13 wherein said thin film head includes a reduced width portion at a foot of the slider, the reduced width portion of the head concentrating the flux at a tip thereof to reduce the width of the recorded bit.

15. A recording system as in claim 14 wherein the main pole comprises a thin, highly permeable layer to concentrate the magnetic flux, and said flux collector has a relatively long surface parallel to said magnetic surface to collect said flux.

16. A recording system as in claim 15 wherein a gap between the flux collector and the main pole is about 400 microinches.

17. A system as in claim 15 wherein the gap between the flux collector and the main pole is substantially greater than the thickness of the main pole.

18. A magnetic recording system as in claim 11 including a back bar of magnetic material on a face of said slider, and attached to the main pole disposed on the face of the back bar to convey the magnetic flux to said main pole.

19. A magnetic recording system as in claim 18 including a notch on the bottom of said back bar terminating in said gap and filled with a non-magnetic material, whereby a concentrated magnetic field path is defined through said flux collector and said back bar.

20. A magnetic recording system as in claim 19 wherein said notch is defined on one side by an angled surface on a face of the back bar facing said main pole, said surface angling away from said main pole toward said slider.

21. A magnetic recording system as in claim 11 including a magnetic back bar disposed on the surface of said main pole for supplying the magnetic flux to the main pole, said flux collector being mounted on said back bar to complete the magnetic circuit.

22. A magnetic recording system as in claim 21 wherein said back bar includes an angled face on the bottom surface thereof, said angled face being directed toward the flux collector and extending from said main pole up away from the surface of said recording medium, thereby defining one face of said gap.

* * * * *